United States Patent

Urbanek et al.

Patent Number: 5,660,783
Date of Patent: Aug. 26, 1997

[54] METHOD OF OPERATING THE CLOSING MEANS OF A DOUBLE PLATE INJECTION MOULDING MACHINE

[75] Inventors: Otto Urbanek, Linz; Heinz Leonhartsberger; Franz Dirneder, both of Schwertberg, all of Austria

[73] Assignee: Engel Maschinenbau Gesellschaft M.B.H., Schwertberg, Austria

[21] Appl. No.: 389,912

[22] Filed: Feb. 16, 1995

[30] Foreign Application Priority Data

Feb. 18, 1994 [AT] Austria ................ 327/94

[51] Int. Cl.⁶ .................................... B29C 45/67
[52] U.S. Cl. ............ 264/328.1; 264/349; 425/590; 425/595
[58] Field of Search ............. 264/328.1, 349; 425/589, 590, 595, 450.1, 451.2, 451.9; 91/519

[56] References Cited

U.S. PATENT DOCUMENTS

| Re. 30,934 | 5/1982 | Hehl ............................... 91/519 |
| 3,327,474 | 6/1967 | Schiffer . |
| 3,663,140 | 5/1972 | Hehl ............................... 425/590 |
| 3,786,725 | 1/1974 | Aoki ............................... 91/519 |
| 3,935,791 | 2/1976 | Hehl ............................ 425/451.2 |
| 4,861,259 | 8/1989 | Takada ............................ 425/595 |
| 4,925,618 | 5/1990 | Takada ............................ 425/595 |
| 4,992,036 | 2/1991 | Herdtner et al. ................. 425/595 |
| 5,422,060 | 6/1995 | Nakamura ....................... 425/590 |

FOREIGN PATENT DOCUMENTS

| 1554912 | 12/1970 | Germany . |
| 2126761 | 7/1977 | Germany . |
| 46-9662 | 3/1971 | Japan ........................ 425/450.1 |
| 62-22348 | 6/1987 | Japan . |

*Primary Examiner*—Jill L. Heitbrink
*Attorney, Agent, or Firm*—Notaro & Michalos PC

[57] ABSTRACT

In order to operate the closing means of a double plate injection moulding machine including a fixed and a movable mould plate, the closing means comprising at least one pump (22), at least one high speed cylinder for a high speed stroke and at least one closing cylinder (10) for a closing stroke with a nominal closing force, whereby the closing cylinder (10) includes a double action piston (7) in which both piston faces (13, 14) are the same size and which divides the interior of the closing cylinder (6) into two cylinder sections (8, 9) which are hydraulically connectable via hydraulic lines (21, 22) and a valve (26), the following method is carried out: during the high speed closing operation using the high speed cylinder (3), both sides of the piston (7) of the closing cylinder (10) are pressurized with an equal, high pressure which is as high as or higher than that required to obtain the required nominal closing force, whereby on moving the piston (7) of the closing cylinder (10) in the closing direction (15), the valve (26) allows the pressure between the two cylinder sections (8, 9) to be equalized, and in that the power closing operation is effected by releasing hydraulic oil from the cylinder section (9) of the closing cylinder (10) in which the hydraulic pressure causes a force which acts on the movable mould plate in the direction opposite to the closing direction (15), the valve preventing the pressure between the two cylinder sections (8, 9) from being equalized.

8 Claims, 3 Drawing Sheets

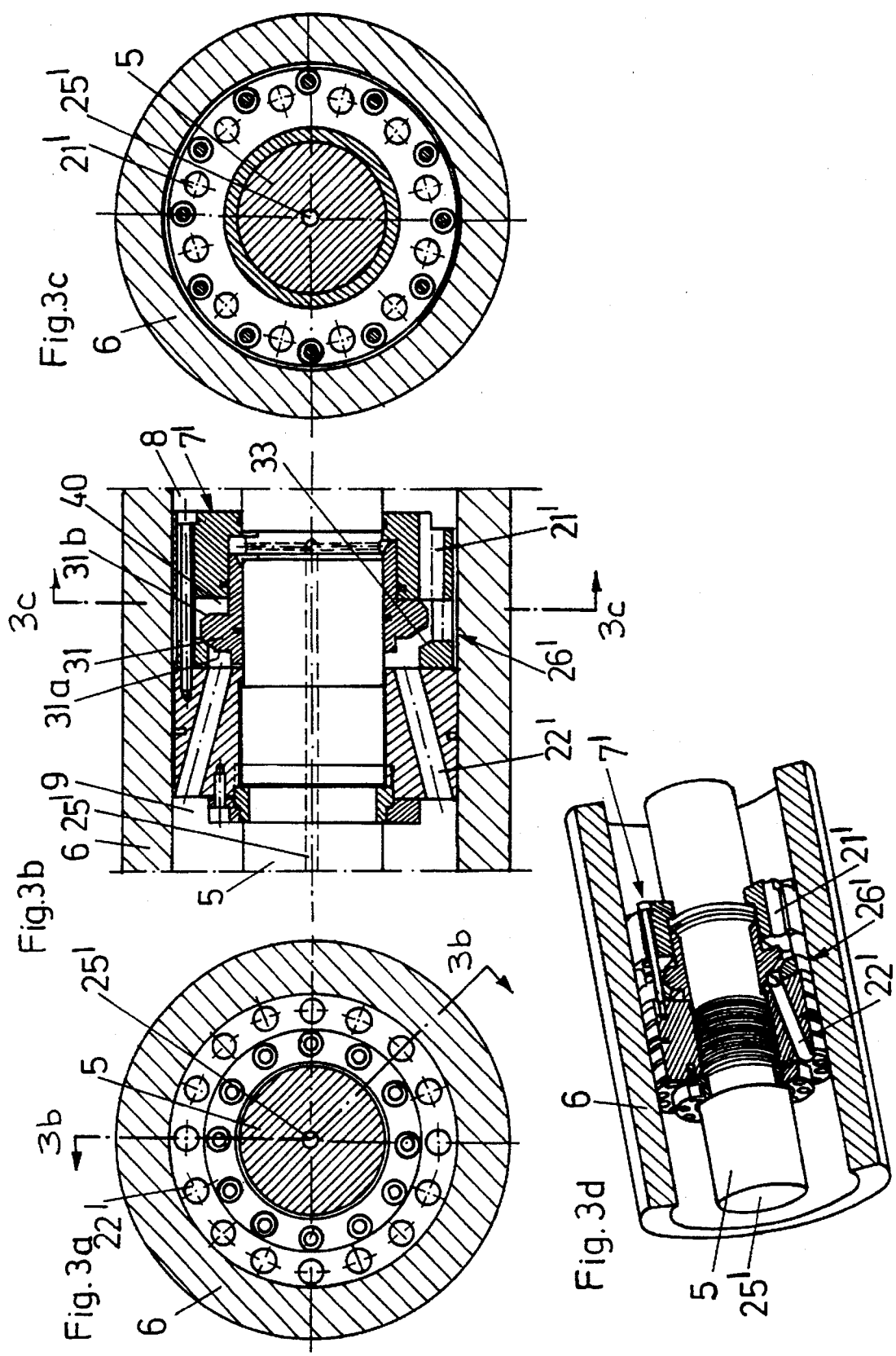

METHOD OF OPERATING THE CLOSING MEANS OF A DOUBLE PLATE INJECTION MOULDING MACHINE

FIELD AND BACKGROUND OF THE INVENTION

The invention concerns a method of operating the closing means of a double plate injection moulding machine including a fixed and a movable mould plate, the closing means comprising at least one pump, at least one high speed cylinder for a high speed stroke and at least one closing cylinder for a high power stroke with a nominal closing force, whereby the closing cylinder includes a double action piston in which both piston faces are the same size and which divides the interior of the closing cylinder into two cylinder sections which are hydraulically connectable via hydraulic lines and a valve.

Closing means for double plate injection moulding machines normally have independently operable piston cylinders to carry out a high speed stroke and a high power stroke.

In conventional methods for operating such closing means, firstly the mould half which is fixed to the movable mould plate is quickly urged towards the mould half which is fixed on the fixed mould plate by means of the high speed cylinder, using a small closing force. Then the two mould halves are closed or held together by the high hydraulic pressure which has been built up in the high power cylinder. The injection operation is then carried out (including the pressure dwell phase). Following a cooling phase after the injection operation, the mould halves are opened by completely releasing the hydraulic pressure from the high power cylinder, and the injection moulded article is removed from the mould. This completes a machine cycle and the next machine cycle is begun by closing the two mould halves once again.

SUMMARY OF THE INVENTION

The object of the invention is to improve the conventional method of operating the closing means of a double plate injection moulding machine, and in particular to accelerate the machine cycle.

In accordance with the invention, this is achieved in a double plate injection moulding machine including a closing means as described above by providing that, near the end of the high speed closing operation using the high speed cylinder, both sides of the piston of the closing cylinder are pressurized with an equal, high pressure which is as high as or higher than that required to obtain the required nominal closing force, whereby on moving the piston of the closing cylinder in the closing direction, the valve allows the pressure between the two cylinder sections to be equalized, and in that the high power closing operation is effected by releasing hydraulic oil from the cylinder section of the closing cylinder in which the hydraulic pressure causes a force which acts on the movable mould plate in the direction opposite to the closing direction, the valve preventing the pressure between the two cylinder sections from being equalized.

Since both piston faces of the closing cylinder are equal in size, on pressurizing the two cylinder sections with the same pressure, the forces generated in the closing direction and in the opposite direction cancel each other out and there is no resultant force in the closing cylinder.

Advantageously, the high pressure in the two cylinder sections of the closing cylinder is built up before the high speed closing operation is commenced. If the pressure rise occurs during an idle period in the injection moulding cycle, advantageously during the cooling phase following the injection operation, then the time required to build up the pressure in the closing cylinder has no effect on the period of the machine cycle and the frequency of the injection operation can be increased.

When the double action piston of the closing cylinder is moved during the high speed closing operation, the oil which is forced out of one cylinder section can flow through the valve between the cylinder sections into the other cylinder section to maintain the same pressure in both cylinder sections.

The high power stroke following the high speed stroke is effected by releasing hydraulic oil from the cylinder section whose hydraulic pressure causes a force which acts on the movable mould plate in a direction opposite to the closing direction, the valve preventing the pressure between the two cylinder sections from being equalized. This builds up the closing force very rapidly.

It is possible to stop the effect of the closing force after completion of the injection operation by equalizing the pressure between the two cylinder sections by opening the valve between the two cylinder sections. A medium pressure is generated in the two cylinder sections from which the two cylinder sections can be repressurized to the high pressure. Thus it is not necessary to release the pressure completely during the whole of the machine cycle.

It is of particular advantage to use a pilot controlled non return valve between the two cylinder sections.

A further method of releasing the high power closing force lies in equalizing the pressure between the two cylinder sections by pumping hydraulic oil into the cylinder section from which hydraulic oil has been previously released in order to build up the closing force. The closing cylinder is then prepared for the next high power closing operation. In this case too, it is not necessary to release the pressure completely during the whole of the machine cycle.

As well as using a pilot controlled non return valve as the valve between the two cylinder sections, it is also advantageous to use a valve which is integral with the piston of the closing cylinder.

The advantages of the method of the invention lie particularly in shortening the machine cycle period and in improved energy utilisation.

German patent DE-AS 21 26 761 describes a hydraulic mould locking apparatus which operates according to a related principle. The cylinder is also provided with a double action piston which is pressurized on both sides to a high pressure. However, the piston faces are of different sizes so that when the mould halves are closed using a closing means which is independent from the mould locking apparatus, which can produce a high closing force, an opposing force is produced by the mould locking apparatus. Overcoming this opposing force when closing the mould halves increases the pressure in the cylinder and in the connected accumulator. This increased pressure is then used to produce a force which locks the mould halves together but which is substantially less than that generated using the method of the present invention during the high power closing operation.

Further advantages and details of the invention will become clear from the following description which refers to the accompanying drawings.

BRIEF DESCRIPTION OF THE DRAWINGS

In the drawings, FIG. 1 schematically shows a side view of a double plate injection moulding machine;

FIG. 3a shows a section through a closing cylinder containing a valve which is integral with the closing cylinder piston, for carrying out the method of the invention;

FIG. 3b shows a section along line 3b—3b in FIG. 3a;

FIG. 3c is a section along line D-3c—3c in FIG. 3b; and

FIG. 3d is a perspective view of a partly sectioned closing cylinder containing a piston with an integral valve.

DESCRIPTION OF THE PREFERRED EMBODIMENTS

Figure 1:
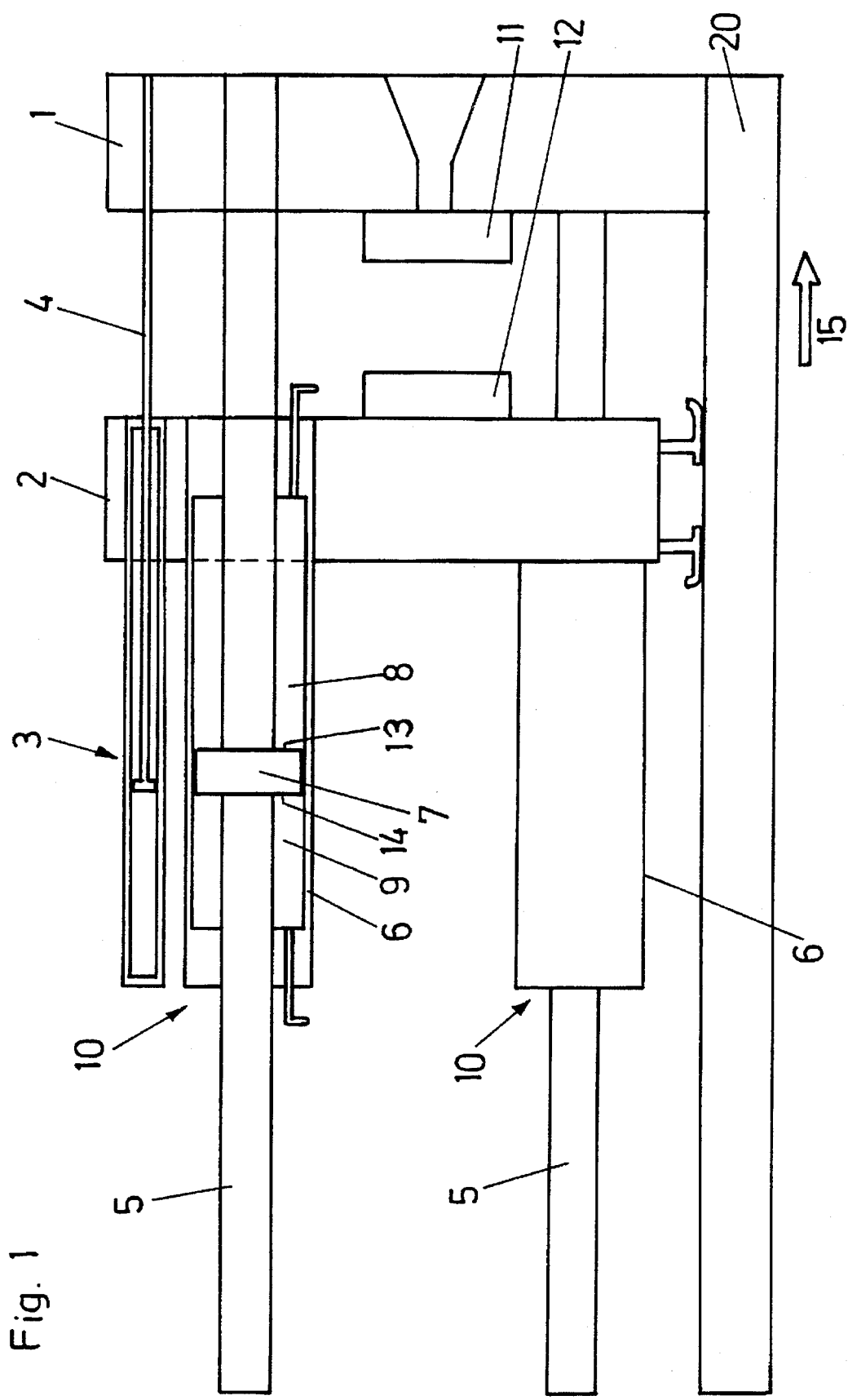

In the double plate injection moulding machine of FIG. 1, a mould plate 1 is fixed to machine frame 20 and holds one mould half 11. A movable mould plate 2 holds the other mould half 12. The fixed mould plate 1 carries the piston rod 4 of high speed stroke cylinder 3, by means of which mould half 12 fixed on movable mould plate 2 can be driven quickly but with a low closing force towards mould half 11 which is fixed on fixed mould plate 1.

Fixed mould plate 1 also carries a piston rod 5 which extends through the cylinder 6 of closing cylinder 10, by means of which the high power stroke can be effected to close the two mould halves 11, 12 with a high power closing force. A double action piston 7 with two equal piston faces 13, 14 is fixed on each piston rod 5 and divides cylinder 6 into cylinder sections 8 and 9. Pressurizing cylinder section 8 with hydraulic oil via hydraulic line 21 causes a closing force 16 in closing direction 15, while hydraulic oil which is brought into cylinder section 9 via hydraulic line 22 causes a force 17 which acts against closing force 16.

Figure 2:
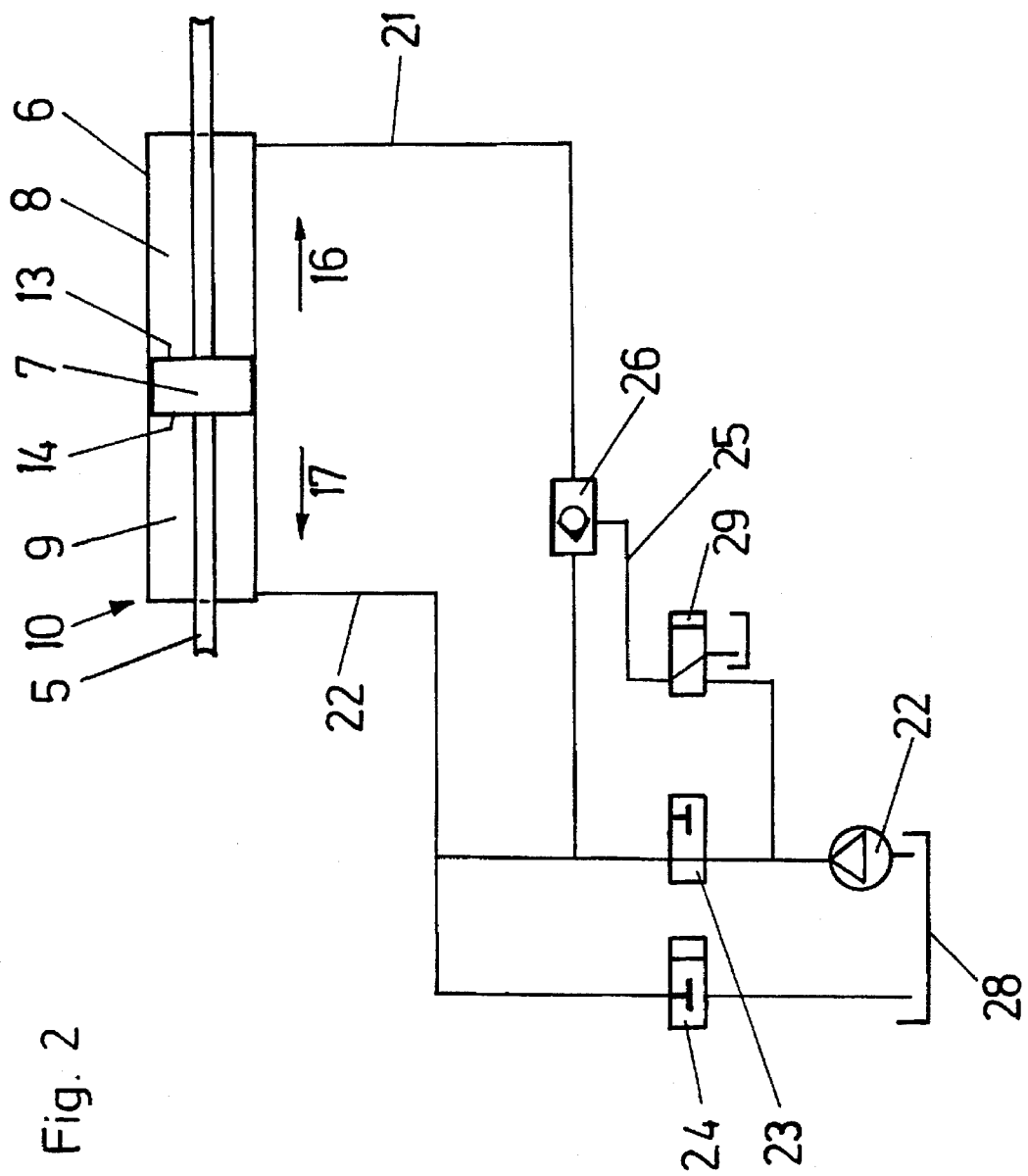
FIG. 2 is a hydraulic circuit diagram for the closing cylinder for the closing stroke.

FIG. 2 shows a diagram of an embodiment of a hydraulic circuit for closing cylinder 10, by means of which the method of the invention, described below, can be carried out.

Cylinder sections 8, 9 of closing cylinder 10 are pressurized by pumping hydraulic oil from tank 28 through open valve 23 via line 22 to cylinder section 9, and through non return valve 26 via line 21 to cylinder section 8, using pump 221. Valve 24 is closed. When a set pressure is reached, for example 280 bar, valve 23 is closed. The set pressure value is somewhat higher than the pressure required to generate the nominal closing force with which the two mould halves 11, 12 are held together during the injection phase. The hydraulic pressure in cylinder sections 8, 9 sets up forces acting in and against closing direction 15. Since the pressure in the two cylinder sections is the same and the two piston faces 13, 14 of double action piston 7 are the same, the forces in and against closing direction 15 cancel each other out and there is no resultant force on movable mould plate 2.

When closing mould plates 1, 2 using high speed cylinder 3, the size of cylinder section 8 is increased at the same rate as that of cylinder section 9 is reduced. The hydraulic oil which is forced out of cylinder section 9 flows through line 22, through non return valve 26 and through line 21 onto cylinder section 8, keeping the pressure in the cylinder sections the same. Valves 23 or 24, advantageously seat valves, are closed.

Following the high speed stroke, the mould plates are in the closed position, with the two mould halves 11, 12 closed. The high power stroke is carried out by opening valve 24 to let hydraulic oil flow from cylinder section 9 through line 22 into tank 28. The pressure in cylinder section 9 thus suddenly drops and the pressure differences between the two cylinder sections 8, 9 cannot be balanced because of non return valve 26. When the pressure in cylinder section 9 falls, the force acting against closing direction 15 on the movable mould plate also suddenly drops, and the resultant overall closing force develops very rapidly. Since the movable mould plate 2 is slightly deformed, or the piston rod 5 is slightly stretched by the closing force, the pressure in cylinder section 8 drops a little. If the original pressure has been correctly selected, the correct pressure is produced to develop the nominal closing force.

When the injection operation (including the pressure dwell phase) is finished, the closing force 16 from cylinder section 8 of closing cylinder 6 is no longer required. This can be removed by closing valve 24 and unblocking the pilot controlled non return valve 26 by opening valve 29 to pressurize control line 25. Hydraulic oil can then flow out of cylinder section 8 and into cylinder section 9 to develop a medium pressure, for example 100 bar, in both cylinder sections 8, 9. It is then possible to repressurize the two cylinder sections 8, 9 from this medium pressure level to the higher pressure which is above that required to generate the nominal closing force. Thus, opening mould halves 11, 12 does not require all the hydraulic pressure in closing cylinder 6 to be released. The energy utilisation of the systems is thus greatly improved.

Repressurization of cylinder sections 8, 9 advantageously takes place during an idle period, preferably during the cooling period, so that the time required to build up the pressure does not contribute to the overall period of the machine cycle. This shortens the machine cycle compared with the prior art concerning operating the closing apparatus and is an important advantage of the method of the invention.

Opening the two mould halves 11, 12 after the cooling period is effected using the high speed cylinder 3. When the non return valve 26 is blocked, the oil forced out of cylinder section 8 of closing cylinder 10 when moving piston 7 can flow into cylinder section 9, so that closing cylinder 10 does not cause a high resistance even when both sides of piston 7 are pressurized, when the opening operation is carried out using high speed cylinder 3.

It is also possible to remove the closing force produced by closing cylinder 10 after the injection operation by closing valve 24 and opening valve 23 to pump 22, so that cylinder section 9 can be pressurized with pumped oil. When there is no pressure difference between cylinder sections 8 and 9, the force from closing cylinder 10 disappears. Again, a complete pressure drop in closing cylinder 6 is not necessary and cylinder section 9 can be pressurized during an idle period, preferably the cooling period.

Instead of using a pilot controlled non return valve 26, the method of the invention can also advantageously be carried out using the valve 26' which is integral with piston 7' and shown in FIGS. 3a–d.

Piston 7' is provided with a circular channel 40 into which a row of bores 21', 22', constituting hydraulic lines, open to connect circular channel 40 with both cylinder sections 8, 9. Circular valve body 31 is positioned in circular channel 40 and a side wall of circular channel 40 is formed as a valve seat 33. Valve body 31 is axially movable in circular channel 40 and seals the cylinder sections 8, 9 from each other when it abuts valve seat 33. A control line 25' for pilot control of valve 26' passes through piston rod 5. When control line 25' is pressurized, valve body 31 is pressed against valve seat 33 and valve 26' is closed.

When control line 25' is not pressurized, the oil pressures in the two cylinder sections 8, 9 determine whether valve 26' is open or not. The two lateral faces 31a, 31b of valve body 31 have different cross sectional surfaces which are exposed to the oil pressure in the two cylinder sections 8, 9, that on the side of valve seat 33 being larger. Thus when control line 25' is not pressurized and when the oil pressures in the two cylinder sections 8, 9 are equal, valve 26' is open. For clarity, the seals and lines are not shown in FIGS. 3b and 3d.

Valve 26' operates as follows: when piston 7' of closing cylinder 6 is pressurized to the same pressure on each side at the beginning of the high speed closing operation effected by high speed cylinder 3, control line 25' is not pressurized so valve 26' is open and the hydraulic oil forced out of cylinder section 9 during the high speed closing operation can flow into cylinder section 8.

To carry out the high power stroke, control line 25' is first pressurized to close valve 26'. Oil is then allowed to flow out of cylinder section 9 to effect the closing force. To remove the closing force following the injection operation, the pressures in the two cylinder sections 8, 9 are equalized. Valve 26' cannot initially be opened, since even when control line 25' is not pressurized, valve body 31 is pressed against valve seat 33 by the oil pressure in cylinder section 8. For this reason, the closing force is removed by pressurizing cylinder section 9 with oil until valve 26' opens at a particular opening oil pressure (with an unpressurized control line 25'). The opening pressure can be calculated from the difference between the cross sectional areas of the valve body which are exposed to the oil pressures in cylinder sections 8, 9. When, for example, valve 26' is constructed as shown in FIG. 3 and the oil pressure in cylinder section 8 is 280 bar, the opening pressure is about 260 bar.

Following the cooling phase, the opening of valve 26' enables the two mould halves 11, 12 to be opened, by moving movable mould plate 2 in the direction opposite to arrow 15 by means of high speed cylinder 3, whence oil from cylinder section 8 flows through lines 21', 22' into cylinder section 9. Following removal of the injection moulded part and closing mould halves 11, 12 using high speed cylinder 3, the high hydraulic pressure in closing cylinder 6 is immediately available to carry out the high power stroke.

The method of the invention is not restricted to the hydraulic circuit embodiments described. It is possible, for example, for valve 26 to consist of an equivalent pilot controlled spool valve or seat valve.

We claim:

1. A method of operating a closing means of a double plate injection molding machine having a fixed mold plate and a movable mold plate, the closing means comprising at least one pump, at least one high speed cylinder for a high speed stroke and at least one closing cylinder for a high power stroke with a nominal closing force, the closing cylinder comprising a double acting piston having a pair of piston faces, the piston faces being the same size, and the piston divides the interior of the closing cylinder into a first cylinder section and a second cylinder section, the first and second cylinder sections being hydraulically connectable via hydraulic lines and a valve, a hydraulic pressure in said first cylinder section creating a force which acts on the movable mold plate in a closing direction of the movable mold plate, and a hydraulic pressure in said second cylinder section creating a force which acts on the movable mold plate in a direction opposite to said closing direction, wherein the method comprises:

pre-pressurizing each of the pair of piston faces of the closing cylinder with an equal, high pressure which is higher than a closing pressure which is required in said first cylinder section to obtain said nominal closing force when said second cylinder section is pressureless;

closing the molds with said high speed cylinder;

allowing hydraulic oil to move from the second cylinder section to the first cylinder section of the closing cylinder through said valve; and performing a high power closing operation by releasing hydraulic oil from the second cylinder section, whereby said high pressure in the first cylinder section drops to said closing pressure which is required to obtain said nominal closing force, said valve preventing hydraulic oil from flowing from the first cylinder section to the second cylinder section.

2. The method according to claim 1, wherein pre-pressurizing each of the pair of piston faces of the closing cylinder occurs during a cooling period following an injection operation of the molding machine.

3. The method according to claim 1, wherein pre-pressurizing each of the pair of piston faces of the closing cylinder occurs substantially before closing the mold halves with said high speed cylinder.

4. The method according to claim 1, wherein said high pressure in the closing cylinder is substantially constant during closing the molds with said high speed cylinder.

5. The method according to claim 1, further comprising removing the closing force by equalizing the pressure between the first and second cylinder sections.

6. The method according to claim 5, wherein the pressure between the first and second cylinder sections is equalized by opening said valve between the first and second cylinder sections.

7. The method according to claim 5, wherein the pressure between the first and second cylinder sections is equalized by pressurizing the second cylinder section from which hydraulic oil has previously been released.

8. The method according to claim 1, wherein pre-pressurizing each of the pair of piston faces of the closing cylinder is carried out before opening the two mold halves with the high speed cylinder.

* * * * *